3,428,526
PRODUCTION OF RADICICOL
Hans-Peter Sigg, Binningen, and Wolfgang Loeffler, Basel, Switzerland, assignors to Sandoz Ltd. (also known as Sandoz A.G.), Basel, Switzerland
Filed Apr. 30, 1965, Ser. No. 452,248
Claims priority, application Switzerland, May 20, 1964, 6,575/64
U.S. Cl. 195—80      4 Claims
Int. Cl. C12k 1/00; A61k 21/00

ABSTRACT OF THE DISCLOSURE

Process for the production of the antibiotic radicicol (Rhi 12–648) through the cultivation of two new strains of fungus species *Humicola grisea* Traaen (*Fungi imperfecti*, Moniliales). Cultivation takes place in a nutrient medium and the antibiotic is isolated by adsorption or extraction. The antibiotic has marked inhibiting action toward yeast and fungi.

---

Figure 1:
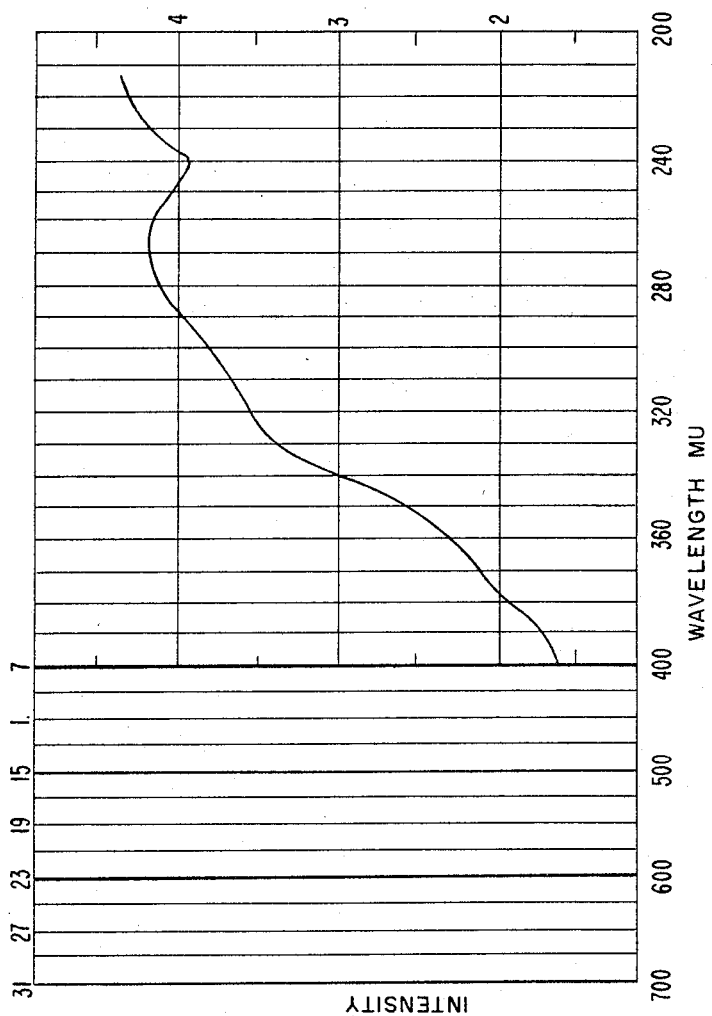

The present invention relates to a new process for the production of an antibiotic, hereinafter called Rhi 12–648.

The antibiotic Rhi 12–648 has also been named radicicol and monorden (R. N. Mirrington, E. Ritchie, C. W. Shoppee, W. C. Taylor, Tetrahedron Letters No. 7, page 365, 1963 and F. McCapra, A. I. Scott, Tetrahedron Letters No. 15, page 869, 1964).

The present invention provides a process for the production of the antibiotic Rhi 12–648, characterized in that two new strains of the fungus species *Humicola grisea* Traaen (*Fungi imperfecti*, Moniliales) described hereinafter, are cultivated in the usual nutrient medium and the said antibiotic is isolated from said culture medium in manner known per se, e.g., by adsorption or extraction.

One of the two new strains of the fungus was isolated from jungle soil samples from Ambalamehene (Ceylon) and was registered with the number S 1190, the other strain was isolated from soil samples from South Africa and was registered with the number S 1503. Specimens of both strains have been deposited with the United States Department of Agriculture (Northern Utilization Research and Development Division), Peoria, Ill., under the reference NRRL 3130 (strain S 1190) and NRRL 3131 (strain S 1503).

On most agar nutrient media [potatoe-dextrose-agar or malt agar (e.g., 2% malt extract, Schweiz. Ferment A.G., Basel, 2% Difco-Bacto-Agar; demineralized water)] with or without the addition of yeast extract, the strains S 1190 and S 1503 form a white to light gray, low and felted aerial mycelium (diameter of colony approximately 70 mm. in 7 to 10 days at +27°) relatively quickly; the under side has a partially gray-brown colouration produced by masses of dark brown chlamydospores. The chlamydospores result on the ends of the hyphae or more often on short side branches of the hyphae; the chlamydospores are first hyaline, round or pear- or club-shaped, later they are usually round and thick-walled, having a brown coloured, somewhat rough outer membrane, usually measuring 8 to 10$\mu$. A second form of conidia, small hyaline aleuriospores, sporadically appears in the aerial mycelium.

For the process of the present invention it is likewise possible to use instead of the above strains S 1190 and S 1503, other strains which may easily be obtained from these, for example by selection or mutation by ultraviolet or X-ray irradiation or other measures, for example by treatment of laboratory cultures with suitable chemicals. The fungus strains S 1190 and S 1503 may be cultivated on various nutrient media containing the usual nutrients. For example, suitable nutrients for these fungus strains are nutrients normally used for carbon-heterotrophic organisms; specific examples of the carbon source are glucose, starch, dextrin, lactose and cane sugar; as the nitrogen source organic or inorganic nitrogen containing compounds may be used, specific examples being peptone, yeast and meat extracts, ammonium sulphate, ammonium nitrate and amino acids; the usual mineral salts and trace elements are also suitable for use in the nutrient.

One method of producing the antibiotic Rhi 12–648 consists in that a liquid nutrient medium is inoculated with a culture of one of the two fungus strains S 1190 and S 1503 and incubated, for example, at room temperature for 2 to 25 days. The cultivation may be effected in static surface culture or in submerged culture while shaking or in fermenters while aerating with air or oxygen while stirring. As soon as the maximum amount of the antibiotic Rhi 12–648 has ben produced, filtration is effected and the antibiotic of the present invention is removed from the culture medium by extractive or adsorptive methods in manner known per se. One method especially suitable for isolating the anti-biotic of the present invention is extraction with ethyl acetate, but other organic solvents, e.g., benzine, benzene, butyl acetate, chloroform or butanol, may be used also; subsequently the extracts are separated from the solvent, e.g., by evaporation or distillation, and the residue purified chromatographically by adsorbing agents, e.g., activated alumina, silica gel or magnesium silicate, or by means of counter current distribution.

Figure 2:
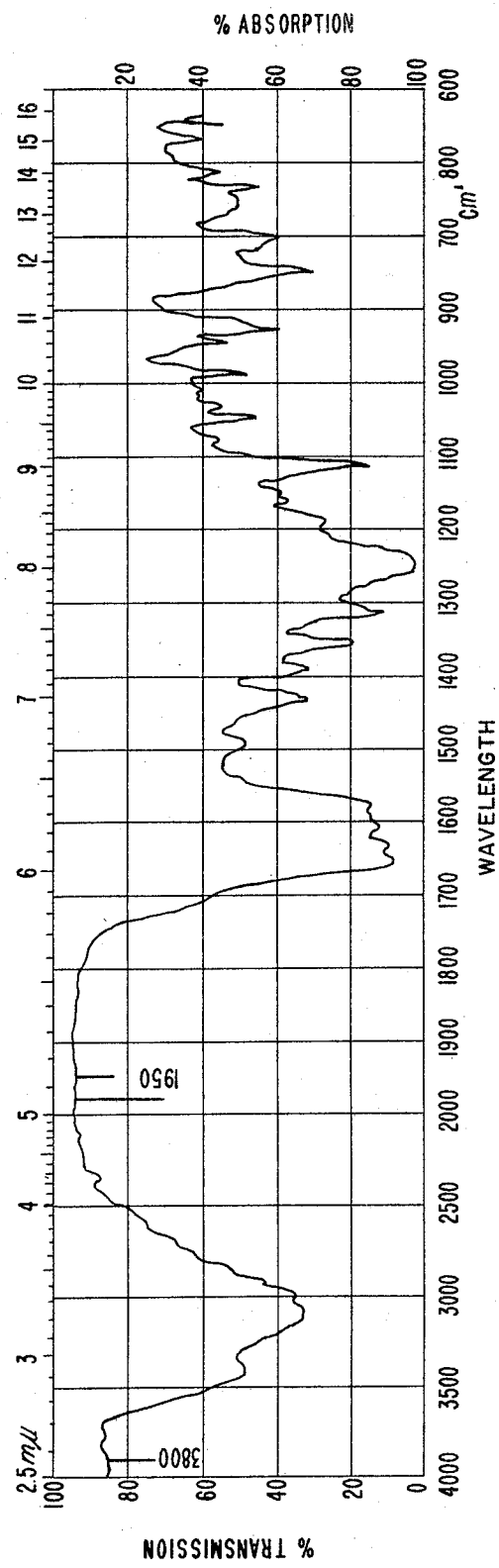

The antibiotic Rhi 12–648 has the following characteristics: Melting point, determined in a heating microscope, 197–199° C. (uncorrected). $[\alpha]_D^{22} = +207°$ (c=1.57 in CHCl$_3$). Ultraviolet spectrum: maximum at 265 m$\mu$/log $\epsilon$=4.17 in methanol (see FIGURE 1). Infrared spectrum: bands at 3100, 2980, 1655, 1572, 1430, 1352, 1310, 1245, 1110, 1045, 983, 925, 845 cm.$^{-1}$ (KBr) (see FIGURE 2). Nuclear magnetic resonance spectra: inter alia doublet at $\delta$=1.52 p.p.m. (3 protons) and a singlet at $\delta$=6.68 p.p.m. (1 proton). (Me$_4$Si: $\delta$=0.00 p.p.m.). For purposes of analysis drying was effected for 12 hours at 25° C. and 0.01 mm. of Hg.

$C_{18}H_{17}O_6Cl$ (364.8).—Calculated: C, 59.3; H, 4.7; O, 26.3; Cl, 9.7%. Found: C, 59.1, 59.4; H, 4.6, 4.6; O, 25.1, 25.6; Cl, 10.0, 9.9%.

Thermoelectric determination of the molecular weight gave values of 368 and 382±2% respectively.

Colour reactions: a methanolic solution of Rhi 12–648 acquires a strong violet colouration after the addition of aqueous FeIC$_3$ solution. A yellowish red colouration results in 2 N NaOH and a brownish violet colouration with concentrated H$_2$SO$_4$.

The antibiotic Rhi 12–648 in vitro shows a marked inhibiting action towards yeast and fungi as may be seen from the following table:

at 27° C. were used in the case of yeast, and conidia suspensions in sterile water with 0.1% of sodium lauryl

| Test Organism | Plate Test | | | Dilution Test | |
|---|---|---|---|---|---|
| | Method | Conc.[1] | Inhibition | Method | Inhibition [2] |
| Yeast: | | | | | |
|   *Saccharomyces cerevisiae*, ETH M-108 (S 8). | A | 2.0<br>2.5 | 20<br>14 | M | (4.0) |
| *Candida tropicalis:*<br>Derm. Universitats-klinik Zurich 169 (S 1256). | A | 2.5<br>3.0<br>3.5<br>4.0 | 28<br>25<br>15<br>trace | M | 4.5 |
| (Thailandia condida Wardanabuti-S 1063). | A | 2.5<br>3.0<br>3.5 | 26<br>20<br>13 | M | 4.5<br>(5.0) |
| *Cryptococcus neoformans:* Derm. Universitats-klinik Zurich (S 1257). | B | 2.0 | trace | O | (4.5) |
| Phycomycetes:<br>  *Mucor pusillus* (S 450) | A | 2.5<br>3.0<br>3.5 | 25<br>15<br>trace | M | (4.5) |
| *Rhizopus nigricans* (S 1345) | B | 2.0<br>2.5<br>3.0 | 30<br>30<br>-------- | | |
| Ascomycetes and Fungi imperfecti:<br>  *Aspergillus fumigatus* (S 130). | A | 2.0<br>2.5<br>3.0<br>3.5 | 35<br>30<br>23<br>15 | M | 4.5 |
| *Endothia parasitica* (S 1248) | B | 2.0<br>2.5<br>3.0<br>3.5<br>4.0 | 35<br>28<>br>24<br>20<br>9 | O | (5.0) |
| *Fusarium anguioides* (S 788) | B | 2.0<br>2.5<br>3.0 | approx. 25<br>approx. 21<br>trace | O | 4.0<br>(5.0) |
| *Myrothecium verrucaria* (S 833). | B | 2.0<br>2.5 | approx. 20<br>trace | O | 4.0<br>(5.0) |
| *Penicillium brefeldianum* (S 464). | B | 2.0<br>2.5<br>3.0<br>3.5 | 26<br>23<br>15<br>trace | O | (4.0) |

[1] Concentration figures as exponents of the negative common logarithms, i e. 3.0=1:1000.
[2] Concentration as given in footnote 1; numbers without brackets: lowest concentration which still has a total or very strong inhibiting effect; numbers in brackets: weaker but distinct inhibition up to the given concentration.
A = Reading after 16 to 20 hours incubation at 37° C.
B = Reading after 24 to 48 hours incubation at 27° C.
M = Test in 2% malt broth, reading after 16 to 20 hours incubation at 37° C.
O = Test as M, reading after 24 to 48 hours incubation at 27° C.

Plate test

A test plate is prepared as follows: A 1 mm. thick germination layer (2% Difco-Bacto-agar-test organisms in the form of cell or germ suspensions) having a suitable concentration is evenly distributed on a sterile agar basis layer of approximately 3 mm. thickness in a Petri dish [malt agar (2% malt extract obtained from Schweiz. Ferment A.G. of Basel, Switzerland)].

The inhibiting action was measured in terms of the diameter of inhibition areas surrounding filter paper disks having a diameter of 6 mm., which were impregnated with solutions of the antibiotic Rhi 12-648 in acetone, after suitable incubation of the test plates. The "Inhibition" quoted above is the average of the diameter in millimeters found after making several tests at the same concentration.

Dilution test

A 1% solution of the antibiotic Rhi 12-648 in acetone was diluted with demineralized water. In this manner solutions were produced having a concentratoin ten times greater than the required concentration, i.e the values of the table, and 1/10 of the final volume (4 ml.) in each test tube, i.e. 0.4 ml. of solution, was introduced in each test tube, so that the concentration in the test tubes was as stated in the table. As suspensions of the test germs dilute, 2-days old cultures grown on a shaking machine at 27° C. were used in the case of yeast, and conidia suspensions in sterile water with 0.1% of sodium lauryl sulphonate were used in the case of mycelia (and conidia) forming fungi.

Antibiotic Rhi 12-648, furthermore, has a strong inhibiting effect on the increase of tumor cells of the mouse mastocytoma p. 815 *in vitro*.

In a suitable nutrient solution these tumor cells increase during 40 hours to 4 to 5 times the initial number. The DE-50 (concentration which inhibits the increase by 50%) of Rhi 12-648 towards these cells is $10^{-7.5}$ g./ml. The acute toxicity of Rhi 12-648 in white mice amounts to 175 mg./kg. i.v.

Antibiotic Rhi 12-648 may be used, for example, in the form of pharmaceutical preparations. These contain the said compound in admixture with a suitable organic or inorganic carrier for enteral, parenteral or local administration. For this purpose it is possible to use materials which do not react with the new compounds and are physiologically acceptable, for example, gelatine, lactose, starch, magnesium stearate, talc, plant oils, benzyl alcohols, gum arabic, polyalkylene glycols, petroleum jelly, cholesterin or other known pharmaceutical carriers. The pharmaceutical preparations may be, for example, in the form of tablets, dragees, powders, creams, suppositories or emulsions; they may be sterilized and/or may contain adjuvants, for example preservatives, stabilizing, wetting or emulsifying agents. They may also contain other therapeutically valuable substances.

The present invention therefore also provides pharmaceutical compositions containing, in addition to a physiologically acceptable carrier, the antibiotic Rhi 12–648 as indicated herein.

In the following non-limitative examples all temperatures are indicated in degrees centigrade.

Example 1

10 litres of a nutrient solution having a pH value of about 5, containing

| | Grams |
|---|---|
| Glucose | 20 |
| $KH_2PO_4$ | 2 |
| $MgSO_4 \cdot 7H_2O$ | 2 |
| Malt extract | 2 |
| Difco-Bacto yeast extract | 2 |

And demineralized water to make up 1 litre.

are incubated in a 10 litre fermenter (New Brunswick Co., New Brunswick, USA, type F 314) with a culture of the strain S 1190 using a suspension of mycelial portions and chlamydospores from an agar culture, for 168 hours at 27° whilst stirring and aerating (300 revolutions per minute, 10 litres of air per minute). The culture solution is then filtered over syrup filter and the clear filtrate is extracted three times, each time with 10 litres of ethyl acetate at 20°. The organic phases are washed with 3 litres of water, combined and freed from the solvent in a rotatory evaporator in vacuo at 35°. The residue is chromatographed on the 50-foot quantity of silica gel (0.2–0.5 mm.) by elution chromatography. The fractions eluted with chloroform are discarded, the fractions eluted with chloroform/ethanol (99:1) are combined, evaporated in a vacuum and the residue is recrystallized from ether or acetone/pentane. The antibiotic Rhi 12–648 forms colourless crystal rosettes having a melting point of 193–194° (uncorrected).

Example 2

10 litres of a nutrient solution having a pH value of about 5, containing

| | Grams |
|---|---|
| Glucose | 20 |
| $KH_2PO_4$ | 2 |
| $MgSO_4 \cdot 7H_2O$ | 2 |
| Malt extract | 2 |
| Difco-Bacto yeast extract | 2 |

And demineralized water to make up 1 litre.

are incubated in a 10 litre fermenter (New Brunswick Co., New Brunswick, USA, type F 314) with a culture of the strain S 1503, using a suspension of mycelial portions and chlamydospores from an agar culture, for 120–144 hours at 27° whilst stirring and aerating (450 revolutions per minute, 5 litres of air per minute). The culture solution is then filtered over syrup filter and the clear filtrate is extracted three times, each time with 10 litres of ethyl acetate at 20°. The organic phases are washed with 3 litres of water, combined and freed from the solvent in a rotatory evaporator in vacuo at 35°. The residue is chromatographed on the 50-fold quantity of silica gel (0.2–0.5 mm.) by elution chromatography. The fractions eluted with chloroform are discarded, the fractions eluted with chloroform/ethanol (99:1) are combined, evaporated in a vacuum and the residue is recrystallized from acetone/pentane. The antibiotic Rhi 12–648 forms colourless crystal rosettes having a melting point of 193–194° (uncorrected).

What is claimed is:

1. A process for the production of radicicol which comprises, cultivating in a nutrient solution containing a source of carbon, nitrogen and mineral salts, a strain of the genus *Humicola grisea Traaen* (*Fungi imperfecti, Moniliales*) or a mutant thereof selected from the group consisting of NRRL 3130 and NRRL 3131, and isolating said antbiotic from said nitrient solution.

2. The process according to claim 1 wherein said nutrient solution is maintained at a temperature of from about 12 to 30° C., stirred and aerated with air or oxygen.

3. The process according to claim 1 wherein said radicicol is isolated from said solution by adsorption.

4. The process according to claim 1 wherein said radicicol is isolated from said solution by extraction.

References Cited

"Chemical Abstracts," vol. 60, 1964, pp. 10623h to 10625b, copy in Chemical Library.

"Nature," vol. 171, 1953, p. 344, copy in Scientific Library.

MAURICE W. GREENSTEIN, *Primary Examiner.*

U.S. Cl. X.R.

195—81; 424—120